No. 813,526. PATENTED FEB. 27, 1906.
J. B. SIMPSON.
GROUND CONNECTION FOR ELECTRIC CIRCUITS.
APPLICATION FILED APR. 11, 1905.
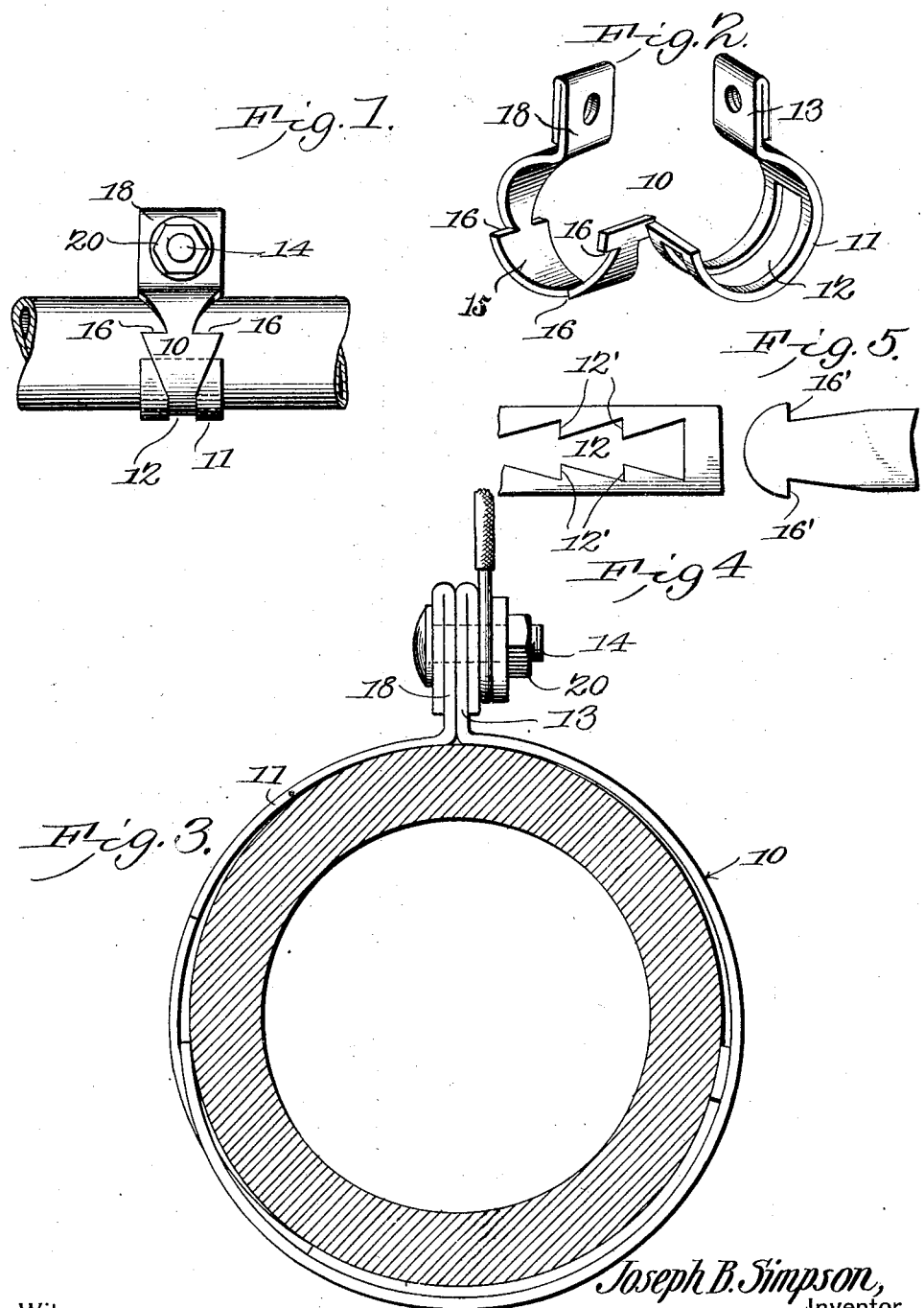
Joseph B. Simpson,
Inventor
Witnesses

UNITED STATES PATENT OFFICE.

JOSEPH B. SIMPSON, OF WASHINGTON, DISTRICT OF COLUMBIA, ASSIGNOR OF ONE-HALF TO CORNELIUS R. THOMAS, OF WASHINGTON, DISTRICT OF COLUMBIA.

GROUND CONNECTION FOR ELECTRIC CIRCUITS.

No. 813,526.

Specification of Letters Patent.

Patented Feb. 27, 1906.

Application filed April 11, 1905. Serial No. 254,928.

*To all whom it may concern:*

Be it known that I, JOSEPH B. SIMPSON, a citizen of the United States, residing at Washington, in the District of Columbia, have invented a new and useful Ground Connection for Electric Circuits, of which the following is a specification.

This invention relates to devices for forming ground connections for telephone and other electric circuits, and has for its principal object to provide a simple form of pipe-clip which may be readily connected to a water or gas pipe of any size having a ground connection, a further object of the invention being to provide a device of this character which will render it unnecessary for the workman to carry more than one size connection.

A still further object of the invention is to provide a pipe-clip which may be firmly clamped to a pipe of any size, the clip being formed in sections which when clamped together will be bound and held by frictional engagement with each other and with the pipe.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a ground connection, showing the same in position on the pipe. Fig. 2 is a detail perspective view of the two members of the connection detached. Fig. 3 is a plan view, on an enlarged scale, showing the pipe in section. Figs. 4 and 5 are detail views of portions of the modified form of clip.

Similar numerals of reference are employed to indicate corresponding parts throughout the several figures of the drawings.

In making ground connections for telephones and other lines as now practiced it is usual to scrape a water or gas pipe at any convenient point, and then after stripping the insulation from the current-conducting wire to wrap the wire tightly around the scraped portion of the pipe. This insures a good connection, but takes considerable time, especially if the pipe is placed close to the wall. In carrying out the present invention a clip 10 is employed. This clip 10 is formed of two strips, one of which, 11, is provided with an elongated slot 12, and at one end has a perforated ear 13 for the passage of a bolt 14. The opposite member 15 of the clip is provided with a plurality of spaced shoulders 16, disposed in alinement with each other and so arranged that when one of the strips is turned with respect to the other they may be adjusted to form a clip of any desired length, and when turned one set of shoulders will be in position to engage against the end of the slot 12. One end of the strip 15 is provided with a clamping-ear 18, also perforated for the passage of the bolt.

It is not essential that the shoulders 16 bear against the end wall of the slot to insure firm locking of the clip in place, for the reason that the two members of the clip will be held frictionally upon each other and upon the pipe when the clamping-nut 20 is turned, although, of course, a tighter connection could be secured by adjusting the device so that one or other set of shoulders would remain at the end of the slot 12.

The construction may be modified in the manner shown in Figs. 4 and 5 by employing a single set of shoulders 16' on one strip and providing the walls of the slot 12 with a plurality of pairs of recesses 12', as will be clearly understood.

The ends of the clip members, which are turned to form the clamping-ears, are preferably doubled, as shown, in order to increase and strengthen the rigidity of the clip at the point where the greatest strain occurs.

A current-conducting wire may be clamped in position by placing the same between one of the pivot-ears and a washer surrounding the bolt, as shown in Fig. 3.

The clip is of such character that it may be readily removed from position when no longer required and used for the grounding of another circuit, the clips being of such construction that they will last for a practically indefinite period.

Having thus described the invention, what is claimed is—

1. In a ground connection for electric circuits, a clamp including two metallic strips, one having an elongated slot, and the other being provided with a plurality of pairs of shoulders for engagement with the end wall of the slot, and means for clamping said strips around the pipe.

2. In a ground connection for electric circuits, a pipe-clamp including two metallic strips, one end of one of the strips having an elongated slot, and one end of the other strip being provided with a plurality of pairs of shoulders for engagement with the end wall of the slot, the opposite ends of the two strips being turned outward and bent to form reinforcing-ears, said ears being perforated, and a clamping-bolt extending through said ears and serving, also, as a binding-post for the current-conducting wire.

In testimony that I claim the foregoing as my own I have hereto affixed my signature in the presence of two witnesses.

JOSEPH B. SIMPSON.

Witnesses:
 E. K. Fox,
 Fred R. Walter.